United States Patent [19]

Arakawa et al.

[11] Patent Number: 5,017,530

[45] Date of Patent: May 21, 1991

[54] SILICON NITRIDE SINTERED BODY AND PROCESS FOR PREPARATION THEREOF

[75] Inventors: Toshihiko Arakawa; Toshiyuki Mori; Yoshihiro Matsumoto, all of Yokohama, Japan

[73] Assignee: Tosoh Corporation, Shinnanyo, Japan

[21] Appl. No.: 401,508

[22] Filed: Aug. 30, 1989

Related U.S. Application Data

[63] Continuation of Ser. No. 148,631, Jan. 26, 1988, abandoned.

[30] Foreign Application Priority Data

Nov. 28, 1987 [JP] Japan ................... 62-016283

[51] Int. Cl.$^5$ ............................. C04B 35/58
[52] U.S. Cl. ........................ 501/98; 501/97; 423/344
[58] Field of Search .............. 501/98, 89, 95, 96, 501/97

[56] References Cited

U.S. PATENT DOCUMENTS

| 3,969,125 | 7/1976 | Komeya et al. | 106/73.2 |
| 4,284,432 | 8/1981 | Nishida et al. | 106/73.2 |
| 4,341,874 | 7/1982 | Nishida et al. | 501/97 |
| 4,654,315 | 3/1987 | Hsien | 501/98 |

FOREIGN PATENT DOCUMENTS

| 197548 | 10/1980 | European Pat. Off. . | |
| 199178 | 10/1980 | European Pat. Off. . | |
| 204103 | 12/1986 | European Pat. Off. . | |
| 208801 | 1/1987 | European Pat. Off. . | |
| 52-10462 | 3/1977 | Japan | 501/98 |
| 52-57100 | 5/1977 | Japan | 501/98 |
| 61-178473 | 8/1980 | Japan . | |
| 58-55375 | 4/1983 | Japan | 501/98 |
| 61-63570 | 4/1986 | Japan | 501/98 |
| 61-163169 | 7/1986 | Japan . | |
| 61-163170 | 7/1986 | Japan . | |
| 61-186263 | 8/1986 | Japan . | |
| 61-256978 | 11/1986 | Japan . | |
| 61-270260 | 11/1986 | Japan . | |

Primary Examiner—William R. Dixon, Jr.
Assistant Examiner—Alan A. Wright
Attorney, Agent, or Firm—Cushman, Darby & Cushman

[57] ABSTRACT

A silicon nitride sintered body comprised of 1.5 to 3.0% by weight of $Y_2O_3$, 0.1 to 1.0% by weight of $Al_2O_3$ and 96 to 98.4% by weight of $Si_3N_4$ wherein the $Y_2O_3/Al_2O_3$ weight ratio is at least 2.5, and having a density of at least 3.0 g/cm$^3$, exhibits a high oxidation resistance and a high strength at a high temperature. This silicon nitride sintered body is prepared by sintering a powdery mixture consisting essentially of 1.5 to 3.0% by weight of $Y_2O_3$ powder, 0.1 to 1.0% by weight of $Al_2O_3$ powder, and 96 to 98.4% by weight of $Si_3N_4$ powder, the $Y_2O_3/Al_2O_3$ weight ratio being at least 2.5, the oxygen content in the $Si_3N_4$ powder being less than 2.0% by weight and the total metallic impurity content in the $Si_3N_4$ being less than 200 ppm, at a temperature of 1,850° to 2,000° C. in a non-oxidizing atmosphere.

3 Claims, No Drawings

SILICON NITRIDE SINTERED BODY AND PROCESS FOR PREPARATION THEREOF

This is a continuation of application Ser. No. 148,631, filed Jan. 26, 1988, which was abandoned upon the filing hereof abandon.

BACKGROUND OF THE INVENTION (1) Field of the Invention

The present invention relates to a silicon nitride sintered body having a high oxidation resistance and a high strength at a high temperature, and a process for the preparation of this silicon nitride sintered body.

(2) Description of the Related Art

Since a silicon nitride sintered body has a high strength, a high heat resistance, a high thermal shock resistance, a high abrasion resistance, and a high oxidation resistance, it is probable that this silicon nitride sintered body will be utilized as structural ceramics for gas turbine members, steel-making high-temperature rolls and the like where severe high-temperature conditions apply. Since it is difficult to sinter a material composed solely of silicon nitride, densification is attempted by adding various sintering aids. The sintering aids, however, form a glassy phase having a low melting point in the grain boundary of silicon nitride and the high-temperature strength is often reduced by the presence of this glassy phase. To eliminate this disadvantage, the following methods have heretofore been proposed.

(1) The addition of an oxide of a rare earth element, such as yttrium oxide.

(2) The addition of an oxide of a rare earth element, such as yttrium oxide, and an oxide such as aluminum oxide (see, for example, Japanese Examined Patent Publication No. 49-21,091).

(3) The addition of yttrium oxide, aluminum oxide and aluminum nitride, and after sintering, the precipitation of a second phase of yttrium aluminum garnet (YAG) or the like by a heat treatment (Japanese Unexamined Patent Publication No. 58-55,375).

However, these methods have the following problems from the practical viewpoint.

(1) According to the method in which yttrium oxide is added, the grain boundary of silicon nitride is bonded through, for example, a highly viscous glass or a crystalline composition such as $Si_3N_4 \cdot Y_2O_3$ and, therefore, the reduction of the high-temperature strength and high-temperature creep resistance is small, but the high-temperature strength is still too low. Moreover, since sintering is difficult, pressureless sintering cannot be employed.

(2) According to the method in which yttrium oxide and aluminum oxide are added, sintering is promoted and a sintered body having a high density and a high strength can be obtained even by pressureless sintering. However, the reduction of the high-temperature strength is still large, and unless a special sintering method such as a hot-press method is adopted after an operation such as a crystallization treatment, a dense sintered having an excellent high-temperature strength cannot be obtained.

(3) According to the method in which a second phase is precipitated by a heat treatment after sintering, the reduction of the high-temperature strength is moderated, but the precipitation of the second phase causes a change of the volume and, therefore, the thermal shock resistance of the sintered body is lowered.

Moreover, in the sintered bodies obtained according to these methods, the temperature at which the oxidation resistance is effected is about 1,200° C. at highest, and therefore, such sintered bodies cannot be applied at higher temperatures, and accordingly, silicon carbide is mainly used as the applicable ceramic material at temperatures higher than about 1,300° C.

SUMMARY OF THE INVENTION

It is a primary object of the present invention to provide a silicon nitride sintered body in which the above-mentioned problems are overcome, namely, to produce a silicon nitride sintered body having a high oxidation resistance and a high strength at a high temperature, and a process for the preparation thereof.

It is generally known that various additives are used for imparting a sintering property, but most of these additives form a glassy phase at a high temperature or are readily softened at a high temperature and thus satisfactory results cannot be obtained. Research was carried out to solve such problems, and as a result, it was found that, if a system comprising yttrium oxide, aluminum oxide, and silicon nitride is selected and the proportions of the respective components are controlled, a silicon nitride ceramic having an oxidation resistance at 1,400° C. can be obtained without an adverse affect on the physical properties.

In accordance with the present invention, there is provided a silicon nitride sintered body consisting essentially of 1.5 to 3.0% by weight of yttrium oxide ($Y_2O_3$), 0.1 to 1.0% by weight of aluminum oxide ($Al_2O_3$), and 96 to 98.4% by weight of silicon nitride ($Si_3N_4$) wherein the $Y_2O_3/Al_2O_3$ weight ratio is at least 2.5, and the density of the silicon nitride sintered body is at least 3.0 g/cm$^3$.

Furthermore, in accordance with the present invention, there is provided a process for the preparation of a silicon nitride sintered body, which comprises sintering a powdery silicon nitride mixture of the above-mentioned composition including silicon nitride powder having an oxygen content not more than 2.0% by weight and a total metallic impurity content not more than 200 ppm at 1,850° to 2,000° C. in non-oxidizing atmosphere.

DESCRIPTION OF THE PREFERRED EMBODIMENTS

In the powdery mixture used in the present invention, if the $Y_2O_3$ content is greater than the above-mentioned range, the oxidation resistance is lowered and if the $Y_2O_3$ content is less than the above-mentioned range, the densification of the sintered body is not advanced and the intended increase of the oxidation resistance and strength cannot be obtained. If the $Al_2O_3$ content is greater than the above-mentioned range, the oxidation resistance and the strength at a high temperature are reduced, and if the $Al_2O_3$ content is less than the above-mentioned range, as in the case of the $Y_2O_3$ content, the densification of the sintered body is not advanced and the intended increase of the oxidation resistance and strength cannot be obtained. Moreover, if the $Y_2O_3/Al_2O_3$ weight ratio is lower than 2.5, the oxidation resistance and high-temperature strength are degraded even though the densification is advanced If the density of the sintered body is lower than 3.0 g/cm$^3$, the oxidation resistance and strength are drastically reduced. The silicon nitride sintered body of the present invention preferably consists of 1.5 to 3.0% by weight of $Y_2O_3$, 0.1 to 1.0% by weight of $Al_2O_3$ and the balance of $Si_3N_4$.

If the oxygen content in the $Si_3N_4$ powder used in the present invention is greater than 2.0% by weight and the total metallic impurity content is more than 200 ppm, it is difficult to obtain a sintered body having a density of at least 3.0 g/cm$^3$, and therefore, the oxidation resistance is lowered.

In the preparation process of the present invention, the sintering temperature is in the range of from 1,850° to 2,000° C. If the sintering temperature is too low, the densification is not sufficiently advanced and the density as ceramics is not increased, resulting in an adverse affect on the physical properties. In contrast, if the sintering temperature is too high, a decomposition of silicon nitride is promoted and silicon nitride is greatly decomposed.

Various known sintering methods can be adopted as the sintering method without limitation. For example, the pressureless sintering method, the hot-press method, the gas-compressing method and the hot isostatic pressing method may be adopted Preferably, sintering is effected at a temperature of about 1,850° to 1,900° C., more preferably at a temperature of about 1,850° C. in the pressureless sintering method and at a temperature of 1,900° to 2,000° C. in the gas-compressing method. The sintering time can be appropriately selected according to the sintering temperature, but preferably the sintering time is at least 2 hours.

If the above-mentioned conditions are satisfied, the intended effect of increasing the densification, the oxidation resistance and the strength according to the present invention can be attained.

The reason why the effect of the present invention is obtained by adding the sintering aids in the above-mentioned range and carrying out sintering under the above-mentioned conditions has not been sufficiently elucidated, but is believed to be probably obtained according to the following mechanism.

As pointed out hereinabove, yttria has little affect on the high-temperature strength, but if yttria is added in an amount exceeding 3.0% by weight, the oxidation resistance is lowered. If yttria and alumina are added, a glassy phase is formed and the vitreous phase reduces the high-temperature strength and oxidation resistance, but if the amount of alumina is restricted as specified in the present invention, a highly densified silicon nitride sintered body having a very high oxidation resistance even at a high temperature (1,400° C.) can be obtained. Since the oxidation resistance is gradually lowered as the amount of alumina exceeds the range specified in the present invention, it is considered that the intended effect can be obtained by reducing the amount of aluminum contained in the glassy phase. Furthermore, it is considered that if the $Y_2O_3/Al_2O_3$ weight ratio is lower than 2.5, the phase formed in the grain boundary causes oxidation and a reduction of the strength at high temperatures. For the reasons set forth above, it is considered that according to the present invention, the densification is sufficiently advanced and a sintered body having a high oxidation resistance, a high strength at high temperatures and a high creep resistance at high temperatures can be obtained.

As is apparent from the foregoing description, the silicon nitride sintered body of the present invention is a ceramic having a very high oxidation resistance at a temperature as high as 1,400° C. and a high strength at high temperatures. Accordingly, the field of application of the silicon nitride sintered body is expanded according to the present invention and the sintered body of the present invention can be used as a high-temperature member which is used at a high temperature as described above. This excellent silicon nitride sintered body can be prepared according to the process of the present invention.

The present invention will now be described with reference to the following examples that by no means limit the scope of the invention.

EXAMPLES 1 THROUGH 6 AND COMPARATIVE EXAMPLES 1 THROUGH 6

Starting materials were mixed as shown in Table 1 (all of the mixing ratios are by weight), and the mixture was molded and then sintered by pressureless sintering or nitrogen gas compression sintering to obtain a sample.

The respective preparation conditions adopted are as described below. A powdery mixture comprising, at a predetermined mixing ratio, a silicon nitride powder synthesized by thermal decomposition of silicon imide (TS-10 supplied by Tosoh Corp., oxygen content=1.2% by weight, total metallic impurity content=80 ppm, particle diameter=0.2 to 0.3 μm), a yttrium oxide powder (finely divided product supplied by Mitsubishi Chemical Ind.) and an aluminum oxide powder (AKP supplied by Sumitomo Chemical Co.) was milled for 24 hours in a pot mill made of silicon nitride The mixture was subjected to isostatic pressing under a pressure of 1,500 kg/cm$^2$ to form a molded body having a size of 50 mm × 30 mm × 5 mm. The molded body was embedded in a boron nitride powder and sintered for 4 hours at a predetermined temperature. At a sintering temperature of 1,850° C. or lower, sintering was carried out according to the pressureless sintering method, and at a sintering temperature of 1,950° C., sintering was carried out according to the nitrogen gas pressure sintering method.

The high-temperature strength and oxidation resistance of the obtained sintered body were determined according to the three-point bending method of JIS R-1601-1981 at 1,400° C. and based on the weight gain by oxidation over 100 hours at 1,400° C., respectively. The results are shown in Table 1.

As seen from the results shown in Table 1, the silicon nitride sintered body of the present invention has a very high oxidation resistance and a high strength even at 1,400° C.

TABLE 1

|  | Amount of Additives | | $Y_2O_3/Al_2O_3$ (weight ratio) | Sintering Temperature (°C.) | Density (g/cm$^3$) | Weight Gain by Oxidation (1400° C., 100 hours) (mg/cm$^2$) | High-Temperature Strength (1400° C., 3-point bending method) (kg/mm$^2$) |
| --- | --- | --- | --- | --- | --- | --- | --- |
|  | $Y_2O_3$ (% by weight) | $Al_2O_3$ (% by weight) |  |  |  |  |  |
| Example 1 | 3.0 | 1.0 | 3.0 | 1,950 | 3.23 | 0.09 | 56.5 |
| Example 2 | 2.5 | 1.0 | 2.5 | 1,950 | 3.22 | 0.08 | 48.3 |

TABLE 1-continued

|  | Amount of Additives | | $Y_2O_3/Al_2O_3$ (weight ratio) | Sintering Temperature (°C.) | Density (g/cm³) | Weight Gain by Oxidation (1400° C., 100 hours) (mg/cm²) | High-Temperature Strength (1400° C., 3-point bending method) (kg/mm²) |
| --- | --- | --- | --- | --- | --- | --- | --- |
|  | $Y_2O_3$ (% by weight) | $Al_2O_3$ (% by weight) | | | | | |
| Example 3 | 2.5 | 0.5 | 5.0 | 1,950 | 3.18 | 0.02 | 73.5 |
| Example 4 | 2.5 | 0.1 | 25.0 | 1,950 | 3.16 | 0.10 | 53.2 |
| Example 5 | 1.5 | 0.5 | 3.0 | 1,950 | 3.15 | 0.03 | 52.2 |
| Example 6 | 2.5 | 1.0 | 2.5 | 1,850 | 3.18 | 0.09 | 48.2 |
| Comparative Example 1 | 4.0 | 1.0 | 4.0 | 1,950 | 3.23 | 0.38 | 34.6 |
| Comparative Example 2 | 1.2 | 1.0 | 1.2 | 1,950 | 2.82 | 1.61 | 24.0 |
| Comparative Example 3 | 2.5 | 1.2 | 2.1 | 1,950 | 3.23 | 0.24 | 31.8 |
| Comparative Example 4 | 2.5 | 0.05 | 50.0 | 1,950 | 2.40 | 2.58 | 22.0 |
| Comparative Example 5 | 2.0 | 1.0 | 2.0 | 1,950 | 3.20 | 0.15 | 41.3 |
| Comparative Example 6 | 2.5 | 1.0 | 2.5 | 1,800 | 2.85 | 1.86 | 18.6 |

EXAMPLE 7 AND COMPARATIVE EXAMPLES 7 THROUGH 9

TABLE 2

|  | Kind of $Si_3N_4$ Powder | Mixing Ratio | | Temperature (°C.) | Density (g/cm³) | Weight Gain by Oxidation (1400° C., 100 hours) (mg/cm²) | High-Temperature Strength (1400° C., 3-point bending method) (kg/mm²) |
| --- | --- | --- | --- | --- | --- | --- | --- |
|  |  | $Y_2O_3$ (% by weight) | $Al_2O_3$ (% by weight) | | | | |
| Example 7 | A | 2.5 | 1.0 | 1,950 | 3.22 | 0.08 | 48.3 |
| Comparative Example 7 | B | 2.5 | 1.0 | 1,950 | 2.96 | 0.67 | 40.0 |
| Comparative Example 8 | A | 5.0 | 3.0 | 1,850 | 3.24 | 0.72 | 28.5 |
| Comparative Example 9 | B | 5.0 | 3.0 | 1,850 | 3.16 | 1.43 | 24.3 |

A sample was prepared from starting materials shown in Table 2 in the same manner as described in Examples 1 through 6, and the weight gain by oxidation and the high-temperature strength were determined.

The starting powdery mixture comprised, at a predetermined mixing ratio, a silicon nitride powder synthesized by thermal decomposition of silicon imide (TS-10 supplied by Tosoh, oxygen content=1.21% by weight, total metallic impurity content=80 ppm, particle diameter=0.2 to 0.3 μm; hereinafter referred to as "powder A") or a silicon nitride powder synthesized by direct nitridation of metallic Si (SN-9S supplied by Denki Kagaku Kogyo K.K., oxygen content=2.1% by weight, total metallic impurity content=0.7% by weight, particle diameter=smaller than 10 μm; hereinafter referred to as "powder B") and the above-mentioned yttrium oxide powder and aluminum oxide powder. The results are shown in Table 2.

As seen from the results shown in Table 2, there is a great difference in oxidation resistance of the powders A and B. Namely, in the silicon nitride powder used, the oxygen content must be not more than 2.0% by weight and the total metallic impurity must be not more than 200 ppm.

We claim:

1. A process for the preparation of a silicon nitride sintered body, which consists essentially of sintering a powdery silicon nitride mixture consisting essentially of 1.5 to 3.0% by weight of yttrium oxide powder, 0.1 to 1.0% by weight of aluminum oxide powder, and 96 to 98.4% by weight of silicon nitride powder, the yttrium oxide/aluminum oxide weight ratio being at least 2.5, the oxygen content in the silicon nitride powder being not more than 2.0% by weight and the total metallic impurity content in the silicon nitride powder being not more than 200 ppm, at a temperature of 1,850° C. to 2,000° C. in a non-oxidizing atmosphere.

2. A process according to claim 1 wherein said sintering is effected at a temperature of about 1,850° C. to 1,900° C. by the pressureless sintering method.

3. A process according to claim 1 wherein said sintering is effected at a temperature of 1,900° C. to 2,000° C. by the gas-compressing method.

* * * * *